April 1, 1930.   G. J. STREZYNSKI   1,752,862
HYDRAULIC CLUTCH
Filed Aug. 12, 1927
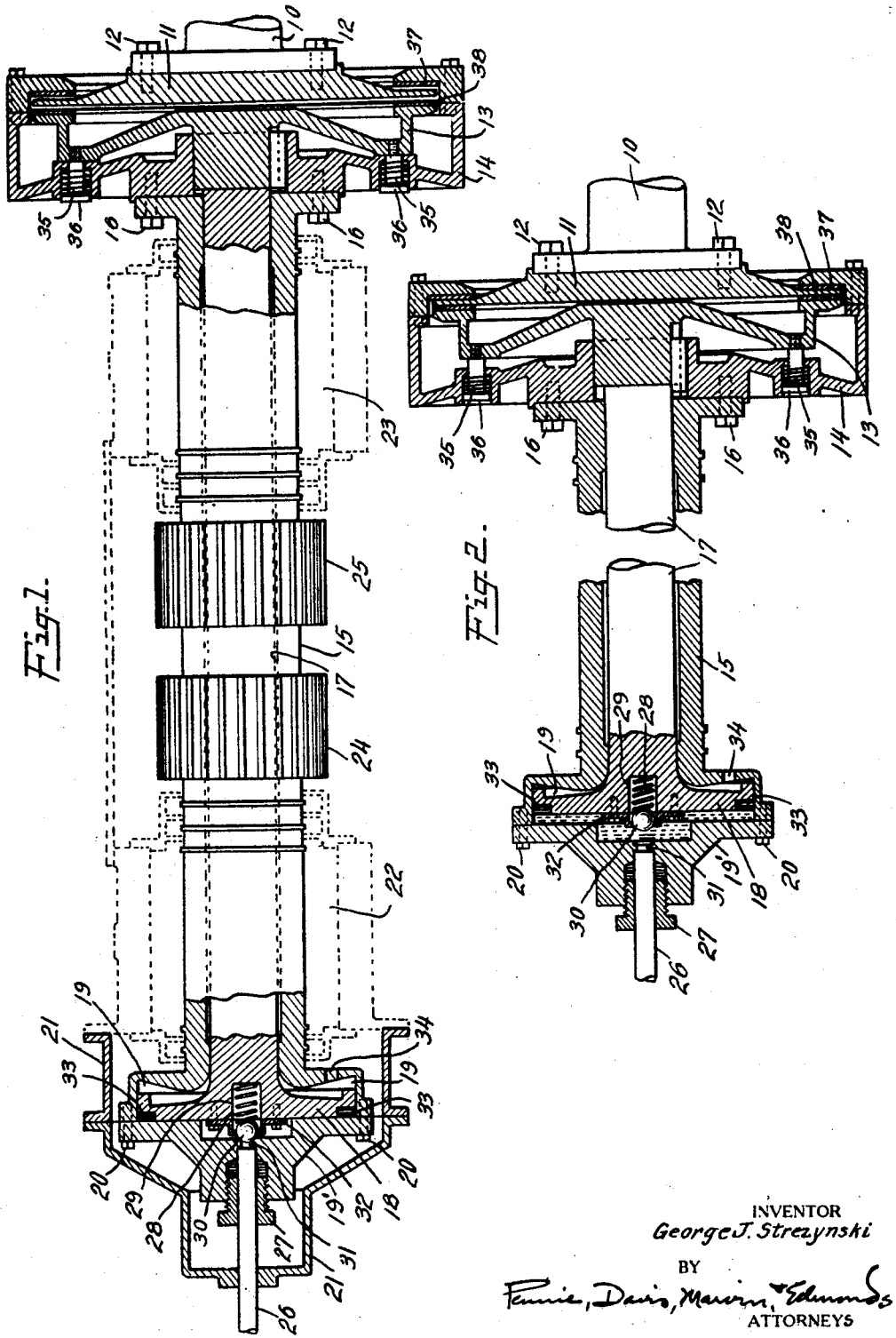
INVENTOR
George J. Strezynski
BY
Fennie, Davis, Marvin, Edmonds
ATTORNEYS Patented Apr. 1, 1930

1,752,862

UNITED STATES PATENT OFFICE

GEORGE J. STREZYNSKI, OF KINGSTON, NEW YORK

HYDRAULIC CLUTCH

Application filed August 12, 1927. Serial No. 212,386.

This invention relates to hydraulic clutches, and has for its object the provision of an improved hydraulic clutch. More particularly, my invention relates to an improved hydraulic clutch which can be operated in such manner that the pressure supplying medium is kept out of contact with the clutch engaging parts; and which can at the same time be so combined with the driving mechanism as to make for a small compact machine.

The hydraulic clutches and their associated driving mechanisms, as at present made, have some undesirable features which materially interfere with their efficiency and practicability. For example, they have been so constructed that the pressure supplying medium, such as oil, steam, and the like, which engages and disengages the clutches, escapes into the clutches. Thus, in the case of friction clutches the oil seeps onto the friction surfaces. This quite naturally sets up slippage which makes prompt clutching impossible. These clutches are, moreover, so designed that it is impossible to remove the oil, which has escaped into them, without much difficulty. In order to clean them, it becomes necessary to shut down the driving mechanism and take the clutches apart. This takes time and thereby reduces the efficiency of the machine.

Since hydraulic clutches are widely used in ships and tugs where space is at a premium, it is also imperative that the clutch engaging parts and their accompanying driving mechanisms take up as little space as possible. It has long been the aim of ships engine designers to further reduce the size of the total driving mechanism and its main supporting castings.

In the practice of my invention it becomes possible to operate hydraulic clutches in such manner that the oil is kept out of contact with the clutch engaging parts. The size of the entire driving mechanism is also reduced to a minimum.

My invention will be better understood by reference to the accompanying drawings, taken in conjunction with the following description, in which:

Fig. 1 is a plan, partly in section of a driving mechanism and its associated hydraulic clutch in the disengaged clutch position; and Fig. 2 is a section in part of Fig. 1 showing the clutch in the engaged position.

The main power transmission shaft 10, to which is attached the clutch part 11, by means of tap bolts 12, is connected to an engine (not shown). The clutch engaging member includes two main parts,—one part 13 of which rests within, but is adjustably attached, to the other part 14. Part 14 is attached to the hollow transmission shaft 15 by means of tap bolts 16. A piston-plunger 17 rests within the shaft 15. One end of the plunger 17 presses against the clutch engaging part 13, while the other end forms a piston head 18 moving within the cylinder 19 formed by the flared out end of the hollow shaft 15. The cylinder head 19' is attached to the cylinder-shaft 15 by means of tap bolts 20.

A housing 21 rests over the cylinder head and shaft just described, as well as over the bearings 22 and 23. Gears 24 and 25 are attached to the shaft 15. They may be meshed with other gears (not shown) to drive the mechanism which ultimately performs the intended work.

A pipe 26 extends through the housing 21 and the bushing 27, and communicates with the passage 31 in the cylinder head 19'. The bushing 27 is adapted to rotate with the cylinder head 19', while the pipe 26 may be fixed against rotation. The piston head 18 contains a compression spring 28, placed in the recess 29, and against which rests a ball 30 adapted to fit into the oil inlet hole 31 in the cylinder head 19', when the piston head is made to contact with, or is brought in close proximity to, the cylinder head. The ball is kept in place by means of the clamp 32 attached to the piston head. The spring-pressed valve 30 functions to prevent the flow of fluid from the pipe 26 into the cylinder 19, when the clutch is idle.

The piston head 18 is also provided with a circumferential leather ring 33 which aids in preventing seepage of oil back of the piston head. The hole 34 is placed in the cylinder 19 and provides for the withdrawal of any oil which may escape behind the piston head.

While the piston-plunger 17 is shown as a unitary member, it might well be split in any suitable manner. Thus, the piston head and the piston might be relatively short, while the hollow shaft 15 would be filled throughout a great part of its length with a separable slidable plunger. The piston-plunger rests against the clutch engaging part 13.

The clutch engaging part 14 is provided with compression springs 35, resting in recessed portions thereof, and through which tap bolts 36 lead into and are fastened to the clutch engaging part 13. While the part 13 can be moved away from the part 14 as the springs 35 are compressed, it is nevertheless attached to the same by means of the tap bolts 36, so that the rotating movements of the two parts will operate simultaneously in the same direction. The part 14 is provided with a gripping surface 37, similar to the gripping surface 38 on the part 13; both of these gripping surfaces are adapted to bear against opposite sides of the clutch part 11.

The operation of the above described apparatus is as follows:

The engine (not shown) is made to revolve the main power transmission shaft 10, which at the same time rotates the clutch part 11. In its normal position the clutch engaging parts 13 and 14 are disengaged from part 11. In order to engage the same, oil is passed through the pipe 26 under pressure. This oil forces the ball 30 away from the opening 31, and a flood of oil escapes into the cylinder 19. It surges against the piston head 18 to such an extent that the piston-plunger 17 is moved forward within the hollow shaft 15. This movement is sufficient to tightly push the part 13 against the part 11 and to push the part 11 against the gripping surface 37, whereby the gripping surfaces 37 and 38 are both made to bear against the part 11. When this is done, the part 13 and the part 14 are simultaneously made to rotate in the same direction. Since the part 14 is attached to the transmission shaft 15, it is also set in motion in the same direction. This, of course, moves the gears 24 and 25, which may be suitably meshed with other gears connected to a mechanism which is to perform the ultimate work.

If it is desired to disengage the clutch, the pressure on the oil against the piston head is released. When that is done, the compression springs 35 in the clutch part 14 expand and draw the clutch part 13 back against the piston-plunger 17. This results in a movement of the piston head 18 back toward its normal position against, or in close proximity to, the cylinder head 19'. At the same time, the ball 30 is tightly pressed against the hole of the oil inlet 31, whereby the flow of oil into the cylinder 19 is completely stopped.

Any oil that may have escaped past the piston head and leather ring 33 is withdrawn through hole 34, preferably to a sump or other collecting vessel (not shown).

It is thus seen that in the practice of my invention it becomes possible to operate hydraulic clutches, so that the pressure supplying medium, such as oil, remains out of contact with the clutches. Moreover, since the piston-plunger that engages and disengages the clutch, and its cooperating mechanisms, is contained within, or is immediately adjacent to, the transmission shaft which turns the working gears, it is also evident that the whole driving mechanism is kept compact; in this manner reducing its size to a minimum.

I claim:

1. Apparatus of the class described comprising a driving member, a transmission shaft mounted adjacent said driving member in spaced relation thereto and having one or more gears mounted thereon intermediate the ends thereof, a clutch member operatively associated with one end portion of said transmission shaft and adapted to engage said driving member, and hydraulically operated means associated with the other end portion of said transmission shaft for mechanically causing said clutch member to engage said driving member.

2. Apparatus of the class described comprising a driving member, a hollow transmission shaft mounted adjacent said driving member in spaced relation thereto and having one or more gears mounted thereon intermediate the ends thereof, a clutch member operatively associated with one end portion of said transmission shaft and adapted to engage said driving member, mechanical means extending through said transmission shaft for causing said clutch member to engage said driving member, and means for moving said clutch member out of engagement with said driving member.

3. Apparatus of the class described comprising a driving member, a hollow shaft mounted adjacent said driving member in spaced relation thereto, a clutch member operatively associated with one end portion of said transmission shaft and adapted to engage said driving member, a cylinder associated with the other end portion of said transmission shaft, a piston mounted within said cylinder, a piston rod attached to said piston and extending through said transmission shaft into contact with said clutch member, and means for introducing a fluid into said cylinder to actuate said piston.

4. Apparatus of the class described comprising a driving member, a hollow shaft mounted adjacent said driving member in spaced relation thereto, a clutch member slidably mounted on one end portion of said shaft, a cylinder associated with the other end portion of said shaft, a piston mounted within said cylinder, means for introducing a fluid into said cylinder to move said piston, and means extending through said shaft and contacting with said clutch member to transmit the movement of said piston to said clutch member and move said clutch member into engagement with said driving member.

5. Apparatus of the class described comprising a driving member, a hollow shaft disposed adjacent said driving member in spaced relation thereto, a clutch member slidably mounted on one end portion of said shaft and adapted to engage said driving member, a cylinder mounted on the other end portion of said shaft in axial alinement therewith, a piston mounted within said cylinder, a piston rod attached to said piston and extending through said shaft into engagement with said clutch member, and means for introducing a fluid into said cylinder to move said piston.

6. Apparatus of the class described comprising a driving member, a hollow shaft disposed adjacent said driving member in spaced relation thereto, a clutch member slidably mounted on one end portion of said shaft and adapted to engage said driving member, a cylinder mounted on the other end portion of said shaft in axial alinement therewith, a piston mounted within said cylinder, means for introducing a fluid into said cylinder to move said piston, and means extending through said shaft for transmitting the movement of said piston to said clutch member to cause said clutch member to engage said driving member.

7. Apparatus of the class described comprising a driving member, a hollow shaft disposed adjacent said driving member in spaced relation thereto, a clutch member slidably mounted on one end portion of said shaft, a cylinder formed integrally with the other end portion of said shaft, a piston mounted within said cylinder, a cylinder head removably mounted on said cylinder, a passage extending through said cylinder head for the introduction of a fluid into said cylinder to move said piston, a piston rod attached to said piston and extending through said shaft into engagement with said clutch member to transmit the movement of said piston to said clutch member and move said clutch member into engagement with said driving member.

8. Apparatus of the class described comprising a driving member, a hollow transmission shaft disposed adjacent said driving member in spaced relation thereto, a clutch member associated with one end portion of said shaft and adapted to engage said driving member, a cylinder associated with the other end portion of said shaft, a piston, a piston rod attached to said piston and extending through said shaft into engagement with said clutch member, a passage for introducing a fluid into said cylinder, and means associated with said piston for closing said passage.

9. Apparatus of the class described, comprising a driving member, a hollow transmission shaft disposed adjacent said driving member in spaced relation thereto, a clutch member associated with one end portion of said shaft and adapted to engage said driving member, a cylinder associated with the other end portion of said shaft, a piston, a piston rod attached to said piston and extending through said shaft into engagement with said clutch member, a passage for introducing a fluid into said cylinder, and a spring-pressed valve associated with said piston for closing said passage.

10. Apparatus of the class described, comprising a driving member, a hollow transmission shaft disposed adjacent said driving member in spaced relation thereto, a clutch member associated with one end portion of said shaft and adapted to engage said driving member, a cylinder associated with the other end portion of said shaft, a piston, a piston rod attached to said piston and extending through said shaft into engagement with said clutch member, a passage for introducing a fluid into said cylinder adjacent one end thereof, and a passage for draining fluid from said cylinder adjacent the other end thereof.

11. In a device of the class described, a cylinder, a piston mounted within said cylinder, a passage extending through one end wall of said cylinder for the introduction of a fluid, and means associated with said piston for closing said passage when the piston is adjacent thereto but being ineffective to close the passage when the piston is otherwise positioned.

12. In a device of the class described, a cylinder, a piston mounted within said cylinder, a passage extending through one end wall of said cylinder for the introduction of a fluid, and a spring-pressed valve associated with said piston for closing said passage when the piston is adjacent thereto but being ineffective to close the passage when the piston is otherwise positioned.

13. In a device of the class described, a cylinder, a piston mounted within said cylinder, a passage for introducing a fluid into said cylinder adjacent one end thereof, a spring-pressed valve associated with said piston for closing said inlet passage, and a passage for withdrawing fluid from said cylinder adjacent the other end thereof.

14. In a device of the class described, a driving member, a transmission shaft disposed adjacent said driving member, an outer clutch member having a portion rigidly secured to said transmission shaft, said clutch member being provided with a portion adapted to engage a face of said driving member, a second clutch member slidably mounted within said outer clutch member and having a portion adapted to engage another face of said driving member, said second clutch member being provided with a hub keyed to the portion of the outer clutch member which is rigidly secured to the shaft, mechanical means arranged longitudinally of the shaft and adapted to be moved with respect thereto for causing the movement of said inner clutch member to effect engagement with said driving member, fluid operated means cooperating with said mechanical means remote from the inner clutch member for effecting the movement thereof, and means tending to resist such movement.

In testimony whereof I affix my signature.

GEORGE J. STREZYNSKI.